United States Patent
Yoo et al.

(10) Patent No.: US 7,663,094 B2
(45) Date of Patent: Feb. 16, 2010

(54) PROBE FOR DATA STORAGE APPARATUS

(75) Inventors: Jin-gyoo Yoo, Seongnam-si (KR); Dae-eun Kim, Seoul (KR); Koo-hyun Chung, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 11/349,176

(22) Filed: Feb. 8, 2006

(65) Prior Publication Data

US 2006/0289722 A1 Dec. 28, 2006

(30) Foreign Application Priority Data

Feb. 11, 2005 (KR) .................... 10-2005-0011593

(51) Int. Cl.
*H01J 3/14* (2006.01)
*H01J 5/16* (2006.01)
*H01J 40/14* (2006.01)

(52) U.S. Cl. .................... 250/234; 250/306; 216/11; 369/126

(58) Field of Classification Search ............... 250/234, 250/235, 306, 307; 216/11; 369/126
See application file for complete search history.

(56) References Cited

U.S. PATENT DOCUMENTS

| | | | | |
|---|---|---|---|---|
| 5,100,507 A | * | 3/1992 | Cholewa et al. ............ 216/24 |
| 5,908,562 A | * | 6/1999 | Ohtsu et al. ................ 216/11 |
| 6,046,972 A | | 4/2000 | Kuroda | |
| 6,252,226 B1 | | 6/2001 | Kley | |
| 6,281,491 B1 | | 8/2001 | Kley | |
| 6,353,219 B1 | | 3/2002 | Kley | |
| 6,438,092 B1 | * | 8/2002 | Hoshino ............... 369/126 |
| 6,507,552 B2 | * | 1/2003 | Gibson ................ 369/126 |
| 6,507,553 B2 | * | 1/2003 | Kley .................... 369/126 |
| 6,587,408 B1 | * | 7/2003 | Jacobson et al. ......... 369/44.16 |
| 6,850,480 B1 | * | 2/2005 | Naito et al. ............ 369/288 |
| 6,861,648 B2 | * | 3/2005 | Kley ..................... 250/306 |
| 2002/0167008 A1 | * | 11/2002 | Hopson et al. ........... 257/69 |
| 2004/0139794 A1 | | 7/2004 | Minne | |

FOREIGN PATENT DOCUMENTS

| | | | |
|---|---|---|---|
| EP | 1 063 641 A | | 12/2000 |
| EP | 1 211 680 A | | 6/2002 |
| JP | 9-506457 A | | 6/1997 |
| WO | 96/09585 A1 | | 3/1996 |
| WO | WO 00/36608 A | | 6/2000 |
| WO | WO 02/053489 A | | 7/2002 |

\* cited by examiner

*Primary Examiner*—Thanh X Luu
*Assistant Examiner*—Francis M Legasse, Jr.
(74) *Attorney, Agent, or Firm*—Sughrue Mion, PLLC

(57) ABSTRACT

A probe for a data storage apparatus. The probe includes a coating layer formed on a tip of the probe, wherein a peak of the tip is exposed and the coating layer and the peak form a predetermined contact area with respect to a recording medium. In addition, the probe may also include an insulating layer formed between the coating layer and the tip of the probe. The coating layer, the insulating layer, and the peak of the tip have a predetermined contact area with respect to the recording medium. Consequently, the probe can obtain high resolving ability by using a sharp-type tip and simultaneously can reduce the degree of abrasion of the peak of the tip, thereby resulting in an excellent durability.

12 Claims, 5 Drawing Sheets

FIG. 3

| LOAD (nN) | SILICON PROBE TIP RADIUS (nm) | | | | | |
|---|---|---|---|---|---|---|
| | 5 | 10 | 20 | 30 | 40 | 50 | 60 |
| 10 | 8.723 | 5.495 | 3.462 | 2.642 | 2.181 | 1.879 | 1.664 |
| 20 | 10.990 | 6.923 | 4.362 | 3.328 | 2.748 | 2.368 | 2.097 |
| 30 | 12.581 | 7.925 | 4.993 | 3.810 | 3.145 | 2.710 | 2.400 |
| 40 | 13.847 | 8.723 | 5.495 | 4.194 | 3.462 | 2.983 | 2.642 |
| 50 | 14.916 | 9.397 | 5.919 | 4.517 | 3.729 | 3.214 | 2.846 |

FIG. 4

| TIP RADIUS (nm) | PITCH (nm) | AREAL DENSITY (Gbit/in$^2$) |
|---|---|---|
| 5 | 10 | 1610 |
| 10 | 20 | 403 |
| 20 | 40 | 101 |
| 30 | 60 | 44.8 |
| 40 | 80 | 25.2 |
| 50 | 100 | 16.1 |
| 60 | 120 | 11.2 |

PROBE FOR DATA STORAGE APPARATUS

BACKGROUND OF THE INVENTION

This application claims the priority of Korean Patent Application No. 10-2005-0011593, filed on Feb. 11, 2005, in the Korean Intellectual Property Office, the disclosure of which is incorporated herein in its entirety by reference.

1. Field of the Invention

The present invention relates to a probe for a data storage apparatus, and, more particularly, to a probe for a data storage apparatus having high resolving ability and excellent durability.

2. Description of the Related Art

As compact products, such as mobile communication terminals and electronic pocket notepads, become more popular, the demand for a micro integrated non-volatile recording medium increases. However, it is not easy to downsize conventional hard disks nor to highly integrate flash memories. Therefore, a data storage apparatus using a scanning probe has been studied as an alternative.

Probes are used in various scanning probe microscopy (SPM) techniques. For example, probes are used for a scanning tunneling microscope (STM) which detect a current produced when a voltage is applied between a probe and a sample to reproduce information, an atomic force microscope (AFM) which uses an atomic force between a probe and a sample, a magnetic force microscope (MFM) which uses an interaction force between a magnetic field from a sample and a magnetized probe, a scanning near-field optical microscope (SNOM) which overcomes a resolution limitation due to the wavelength of visible light, and an electrostatic force microscope (EFM) which uses an electrostatic force between a sample and a probe.

In order to record and reproduce high density information at high speed using such SPM techniques, a nanometer probe is required. Thus, a sharp-type probe may be used, but the sharp-type probe is readily abraded compared to a blunt-type probe.

FIGS. 1 and 2 respectively illustrate pictures of a conventional sharp-type probe and a conventional blunt-type probe obtained during experimental tests for recording and reproducing information. FIGS. 3 and 4 respectively illustrate numerical results of the tip abrasion degree and areal density for each of the probes of experimental results of FIGS. 1 and 2.

Referring to FIGS. 1 through 4, when the same amount of load is applied to the sharp-type probe and the blunt-type probe, the degree of abrasion of tips of each of the probes can be observed. In this experiment, the radius of the tip of the sharp-type tip is 5 nm, the radius of the tip of the blunt-type probe is 50 nm, and the load applied to each of the probes is 30 nN, and the movement speed of each probe is 2 μm/s.

According to the results of the experiment, when the same load is applied to the probes, the tip of the sharp-type probe is abraded more seriously than the tip of the blunt-type probe. This is because the radius of the sharp-type probe is smaller than the radius of the blunt-type probe, and thus, an area to which the load is applied is reduced. Consequently, more pressure is applied to the tip of the sharp-type probe even if the same load is applied to the sharp-type and blunt-type probes.

Since the sharp-type probe has better resolving ability than the blunt-type probe, the sharp-type probe is preferred over the blunt-type probe in manufacturing a high density recording apparatus. However, the degree of abrasion of the sharp-type probe is higher than that of the blunt-type probe.

SUMMARY OF THE INVENTION

The present invention provides a probe for a data storage apparatus, the probe having high resolving ability and improved durability by reducing the degree of abrasion of a tip of the probe.

According to an aspect of the present invention, there is provided a probe for a data storage apparatus which records information on a recording medium or reproduces information recorded on the recording medium. The probe includes a coating layer formed on a tip of the probe, wherein a peak of the tip is exposed and the coating layer and the peak have a predetermined contact area with respect to a recording medium.

The coating layer may be an insulating layer.

The coating layer may be made of $SiO_2$.

The tip may be made of one of TiPt and CoNi.

According to another aspect of the present invention, there is provided a probe for a data storage apparatus which records information on a recording medium or reproduces information recorded on the recording medium. The probe includes: a coating layer formed on a tip of the probe; and an insulating layer formed between the coating layer and the tip of the probe. A peak of the tip is exposed and the coating layer, the insulating layer, and the peak have a predetermined contact area with respect to a recording medium.

The coating layer may be a conductor.

The coating layer may be a diamond like carbon (DLC) layer.

The tip may be made of Si.

The insulating layer may be made of $SiO_2$.

Accordingly, by forming a coating layer and/or insulating layer, a mechanical contact area of a probe for a data storage apparatus is increased, thereby reducing the pressure applied to the probe. Therefore, a sharp-type probe having high resolving ability can be used and the degree of abrasion of a peak of the tip can be reduced. Consequently, the probe has excellent durability.

In addition, since the probe is shielded from the coating layer by the insulating layer, the operation of the probe is not affected by the coating layer.

BRIEF DESCRIPTION OF THE DRAWINGS

The above and other features and aspects of the present invention will become more apparent by describing in detail exemplary embodiments thereof with reference to the attached drawings in which:

FIGS. 3 and 4 illustrate numerical results of the tip abrasion degree and areal density for each of the probes used to obtain the experimental results of FIGS. 1 and 2;

DETAILED DESCRIPTION OF ILLUSTRATIVE, NON-LIMITING EMBODIMENTS OF THE INVENTION

Figure 1:
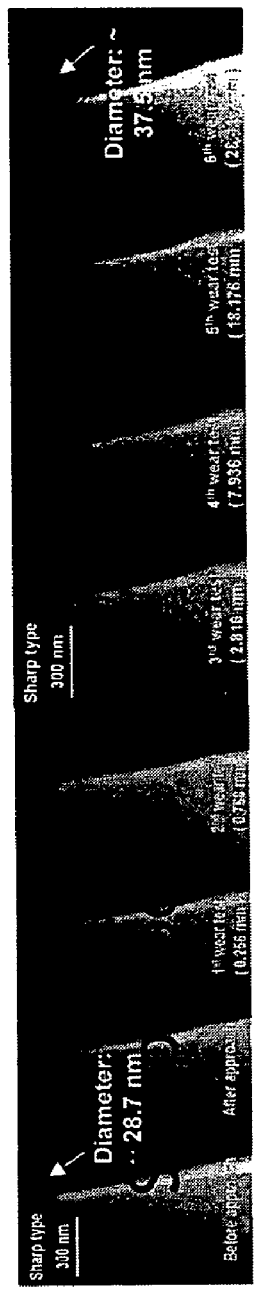
FIG. 1 illustrates an experimental result of a sharp-type probe among a conventional probe for data storage apparatus.
Figure 2:
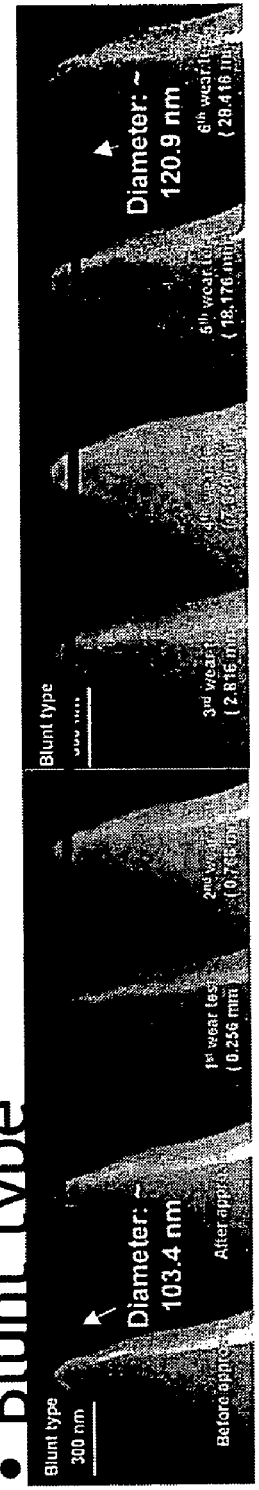
FIG. 2 illustrates an experimental result of a blunt-type probe among the conventional probe for data storage apparatus.

The present invention will now be described more fully with reference to the accompanying drawings, in which exemplary embodiments of the invention are shown. The described exemplary embodiments are intended to assist the understanding of the invention, and are not intended to limit the scope of the invention in any way. Like reference numbers in the drawings denote like elements.

Figure 5:
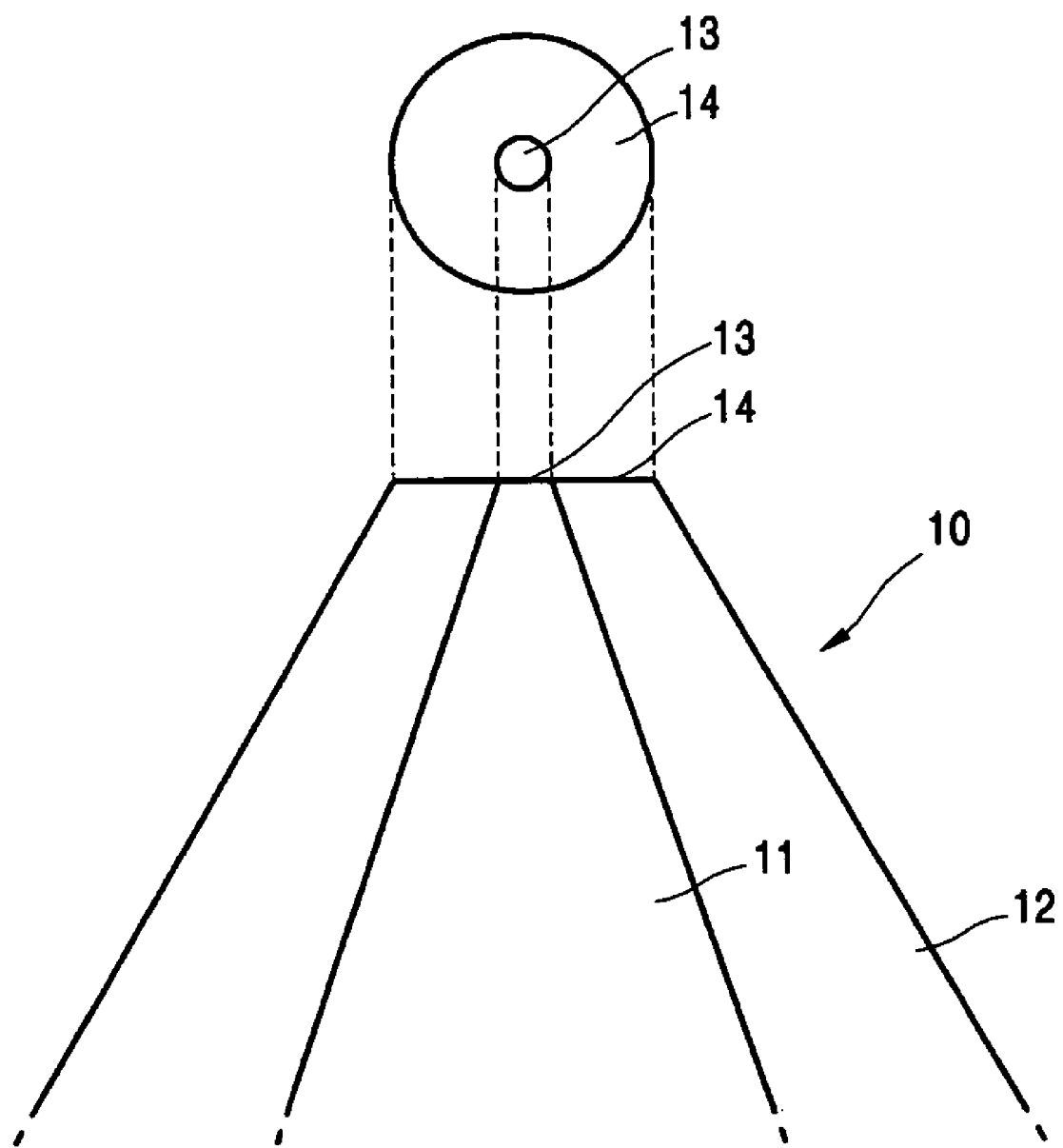
FIG. 5 is a view of a probe for a data storage apparatus according to a first exemplary embodiment of the present invention.
Figure 6:
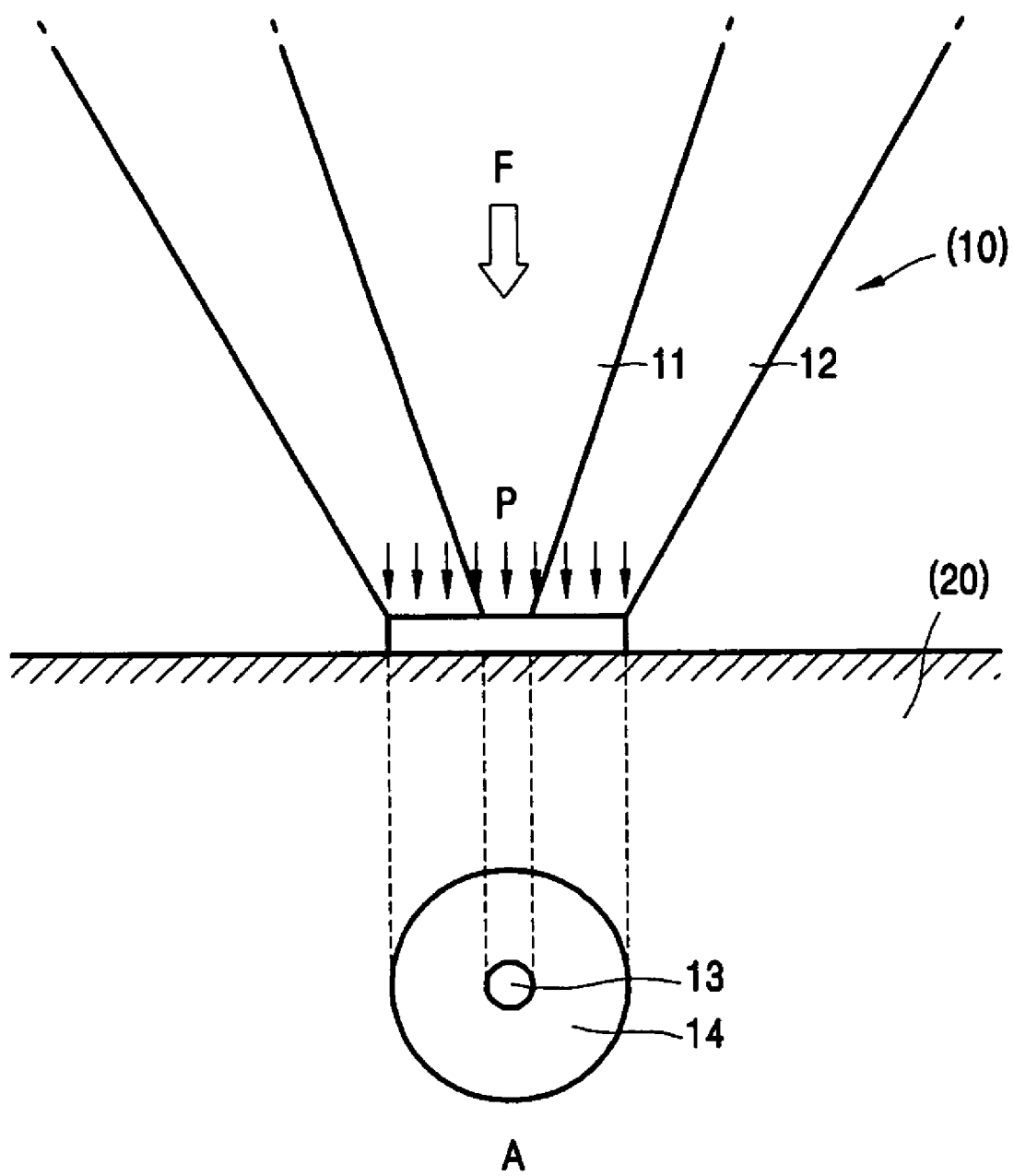
FIG. 6 illustrates a force diagram of the data storage apparatus of FIG. 5.

FIG. 5 is a view of a probe 10 for a data storage apparatus according to a first exemplary embodiment of the present invention, and FIG. 6 illustrates a force diagram of the probe 10.

Referring to FIGS. 5 and 6, the probe 10 includes a tip 11 and a coating layer 12 covering the tip 11. Although only the tip 11 of the probe 10 is illustrated in FIGS. 5 and 6, the probe 10 may include a cantilever (not shown).

The tip 11 may be a resistive-tip. In this case, the tip may have a body made of p-type impurities and n-type impurities, and a resistive region. Also, the tip 11 may be made of TiPt or CoNi.

A peak 13 of the tip 11 can contact a predetermined recording medium.

The coating layer 12 covers the outer circumference of the tip 11. The coating layer 12 may be an insulator. For example, the coating layer 12 may be made of $SiO_2$, which is an insulating material.

According to the present embodiment, the peak 13 is not covered by the coating layer 12, and is exposed towards the recording medium. If the peak 13 is covered by the coating layer 12, the coating layer 12 may act as an electrical resistor, thereby distorting information of the recording medium.

In addition, according to the present exemplary embodiment, the peak 13 and the coating layer 12 forms a predetermined contact area with the recording medium. In more detail, as illustrated in FIG. 6, when a load F is applied to the probe 10, the load F is dispersed on an area A, which is the contract area of the tip 11 and the coating layer 12 with the recording medium. That is, according to the present exemplary embodiment, by providing the tip 11 formed as described above and the coating layer 12, a mechanical contact area can be increased while maintaining a constant electromagnetic contact area of the probe 10. The electromagnetic contact area of the probe 10 is a contact area of the probe 10 related to recording or reproducing information on or from the recording medium, and the mechanical contract area of the probe 10 is an area where the load is dispersed to reduce abrasion of the probe 10. Then, as illustrated in FIG. 6, since the pressure per unit area of the area A is P, the pressure applied to the tip 11 is reduced. Therefore, according to the present exemplary embodiment, the degree of abrasion of the peak 13 can be reduced by using a sharp-type tip 11 with high resolving ability.

Figure 7:
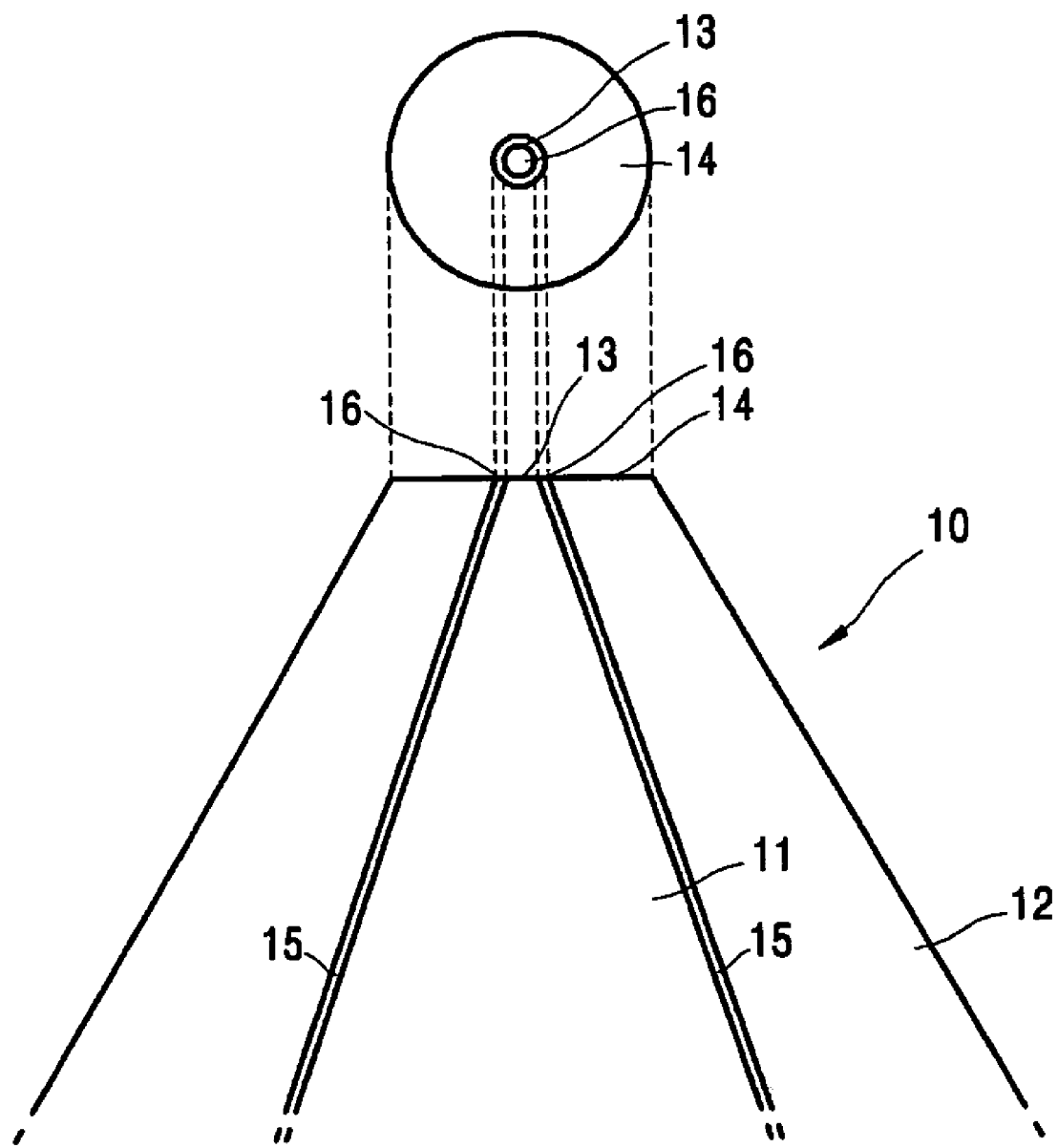
FIG. 7 is a view of a probe for a data storage apparatus according to a second exemplary embodiment of the present invention.

FIG. 7 is a view of a probe 10 for a data storage apparatus according to a second exemplary embodiment of the present invention.

Referring to FIG. 7, the probe 10 includes a tip 11, a coating layer 12 covering the tip 11, and an insulating layer 15 interposed between the tip 11 and the coating layer 12.

The tip 11 may be made of Si.

According to the present exemplary embodiment, the insulating layer 15 is placed between the tip 11 and the coating layer 12 to insulate the tip 11 from the coating layer 12. The insulating layer 15 may be made of $SiO_2$. The coating layer 12 may be formed as a conductor by placing the insulating layer 15 as described above since the coating layer 12 may act as a shield for the tip 11.

The coating layer 12 may be a diamond like carbon (DLC) layer that has a high solidity and a low friction coefficient with a lubricant surface. As such, when the coating layer 12 is a DLC layer, and the insulating layer 15 is placed between the coating layer 12 and the tip 11, the excellent characteristics of the DLC layer can be used while the operation of the tip 11 is not affected by the DLC layer.

In addition, according to the present exemplary embodiment, a peak 13 of the tip 11 is not covered by the coating layer 12 and the insulating layer 15, and is exposed towards a recording medium. If the peak 13 is covered by the coating layer 12 and the insulating layer 15, the coating layer 12 and the insulating layer 15 may act as an electrical resistor and distort information of the recording medium.

Furthermore, according to the present exemplary embodiment, the peak 13, the coating layer 12, and the insulating layer 15 have a predetermined contact area with the recording medium. In more detail, the peak 13, a top surface 14 of the coating layer 12, and a top surface 16 of the insulating layer form a plane area, and simultaneously contact the recording medium. Thus, since the load applied to the tip 11 is dispersed on the peak 13, the top surface 14 of the coating layer 12, and the top surface 16 of the insulating layer 15, the pressure applied to the peak 13 can be reduced. Therefore, the degree of abrasion of the peak 13 can be reduced by using a sharp-type tip 11 with high resolving ability.

By having the tip 11, the coating layer 12, and the insulating layer 15 as described above in the probe 10 according to the present exemplary embodiment, a mechanical contact area of the probe 10 can be increased while maintaining a constant electromagnetic contract area of the probe 10.

According to an exemplary embodiment of the present invention, by forming a coating layer and/or insulating layer, a mechanical contact area of a probe for a data storage apparatus is increased, thereby reducing the pressure applied to the probe. Therefore, a sharp-type probe having high resolving ability can be used and the degree of abrasion of a peak of the tip can be reduced. Consequently, the probe has excellent durability.

In addition, since the probe is shielded from the coating layer by the insulating layer, the operation of the probe is not affected by the coating layer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A probe for a data storage apparatus which records information on a recording medium or reproduces information recorded on the recording medium, the probe comprising: a coating layer formed on a tip of the probe, wherein the tip is resistive, a peak of the tip is exposed and the coating layer and the peak have a predetermined physical contact area with a recording medium, the coating layer is an insulating layer and a thickness of the top surface of the coating layer in a radial direction is larger than the diameter of the peak.

2. The probe of claim 1, wherein the coating layer comprises $SiO_2$.

3. The probe of claim 1, wherein the tip comprises at least of one of TiPt and CoNi.

4. The probe of claim 1, wherein the predetermined contact area of the coating layer and the peak lie in substantially the same plane.

5. The probe of claim 1, wherein the tip comprises p-type impurities, n-type impurities and a resistive region.

6. A probe for a data storage apparatus which records information on a recording medium or reproduces information recorded on the recording medium, the probe comprising:
 a coating layer formed on a tip of the probe; and
 an insulating layer formed between the coating layer and the tip of the probe,
 wherein the tip is resistive, a peak of the tip is exposed and the coating layer, the insulating layer, and the peak have a predetermined physical contact area with a recording medium, wherein a thickness of the top surface of the coating layer in a radial direction is larger than the diameter of the peak.

7. The probe of claim 6, wherein the coating layer is a conductor.

8. The probe of claim 7, wherein the coating layer comprises a diamond like carbon (DLC) layer.

9. The probe of claim 6, wherein the tip comprises Si.

10. The probe of claim 6, wherein the insulating layer comprises $SiO_2$.

11. The probe claim 6, wherein the predetermined contact area of the coating layer, the insulating layer and the peak lie in substantially the same plane.

12. The probe of claim 6, wherein the tip comprises p-type impurities, n-type impurities and a resistive region.

* * * * *